United States Patent
Ekstrand (10) Patent No.: US 10,422,248 B2
(45) Date of Patent: Sep. 24, 2019

(54) METHOD AND SYSTEM FOR PREVENTING OIL ESCAPE

(71) Applicant: VOLVO TRUCK CORPORATION, Gothenburg (SE)

(72) Inventor: Magnus Ekstrand, Svedala (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 207 days.

(21) Appl. No.: 15/516,039

(22) PCT Filed: Nov. 20, 2014

(86) PCT No.: PCT/EP2014/025018
§ 371 (c)(1),
(2) Date: Mar. 31, 2017

(87) PCT Pub. No.: WO2016/078681
PCT Pub. Date: May 26, 2016

(65) Prior Publication Data
US 2017/0284224 A1    Oct. 5, 2017

(51) Int. Cl.
*F01D 25/18* (2006.01)
*F02B 37/00* (2006.01)
(Continued)

(52) U.S. Cl.
CPC .......... *F01D 25/183* (2013.01); *F02B 37/005* (2013.01); *F02B 37/013* (2013.01);
(Continued)

(58) Field of Classification Search
CPC .... F01D 25/183; F01D 21/14; F02D 2250/34; Y02T 10/40; Y02T 10/144; Y02T 10/146; F05D 2270/09
USPC ........................................................ 60/605.3
See application file for complete search history.

(56) References Cited

U.S. PATENT DOCUMENTS 3,375,015 A * 3/1968 Swearingen ............. F16J 15/40
                                                         277/319
4,128,831 A * 12/1978 Rensch .................... F01D 21/14
                                                         340/605
(Continued)

FOREIGN PATENT DOCUMENTS

DE    102005047216 A1 *  4/2007  ............. F01D 15/02
DE    102008028912 A1 * 12/2009  ............. F02B 41/10
(Continued)

OTHER PUBLICATIONS

International Search Report (dated Jul. 21, 2015) for corresponding International App. PCT/EP2014/025018.
(Continued)

*Primary Examiner* — Jason D Shanske
*Assistant Examiner* — Jessica L Kebea
(74) *Attorney, Agent, or Firm* — Venable LLP; Jeffri A. Kaminski (57) ABSTRACT

A method is provided for preventing oil escape into an exhaust gas during operation of a turbocharged engine. The method includes providing pressurized fluid to an area sealing off a bearing housing of an axial turbine unit from an adjacent exhaust conduit downstream of the axial turbine unit, and detecting a malfunction in the provision of pressurized fluid. Further to this, the method includes the step of, in response to such malfunction detection, controlling an exhaust pressure increasing device arranged downstream of the axial turbine unit for increasing the pressure inside the exhaust conduit upstream of the exhaust pressure increasing device.

22 Claims, 4 Drawing Sheets

(51) Int. Cl.
    *F02B 37/013*     (2006.01)
    *F02B 39/16*     (2006.01)
    *F02B 41/02*     (2006.01)
    *F02D 9/04*     (2006.01)
    *F02D 41/22*     (2006.01)
    *F01D 21/14*     (2006.01)
    *F02D 41/00*     (2006.01)
    *F02B 39/14*     (2006.01)

(52) U.S. Cl.
    CPC .............. *F02B 39/14* (2013.01); *F02B 39/16* (2013.01); *F02B 41/02* (2013.01); *F02D 9/04* (2013.01); *F02D 41/22* (2013.01); *F01D 21/14* (2013.01); *F02D 41/0007* (2013.01); *F02D 2250/34* (2013.01); *F05D 2220/40* (2013.01); *F05D 2270/09* (2013.01); *Y02T 10/144* (2013.01); *Y02T 10/40* (2013.01)

(56) References Cited

U.S. PATENT DOCUMENTS

| | | | |
|---|---|---|---|
| 5,079,921 A | 1/1992 | McCandless et al. | |
| 8,123,501 B2 | 2/2012 | Gomilar et al. | |
| 8,646,433 B2 * | 2/2014 | Fransson | F02B 37/183 |
| | | | 123/323 |
| 9,932,848 B2 * | 4/2018 | Giselmo | F01D 11/04 |
| 2004/0112054 A1 | 6/2004 | Larsson et al. | |
| 2007/0107438 A1 * | 5/2007 | Morimoto | F01D 11/06 |
| | | | 60/785 |
| 2013/0011276 A1 | 1/2013 | Patel et al. | |
| 2013/0101401 A1 * | 4/2013 | Shimizu | F01D 11/04 |
| | | | 415/175 |
| 2013/0291828 A1 | 11/2013 | French | |

FOREIGN PATENT DOCUMENTS

| | | | | |
|---|---|---|---|---|
| JP | H04103835 A | 4/1992 | | |
| JP | H04303128 A | 10/1992 | | |
| WO | WO-2011152828 A1 * | 12/2011 | ............ | F02B 37/013 |
| WO | 2014079466 A1 | 5/2014 | | |

OTHER PUBLICATIONS

International Preliminary Report on Patentability (dated Dec. 21, 2016) for corresponding International App. PCT/EP2014/025018.

* cited by examiner

METHOD AND SYSTEM FOR PREVENTING OIL ESCAPE

BACKGROUND AND SUMMARY

The invention relates to a method and a system for preventing oil escape into an exhaust gas during operation of a turbocharged engine.

The invention can be applied in heavy-duty vehicles, such as trucks, buses and construction equipment. Although the invention will be described with respect to a truck, the invention is not restricted to this particular vehicle, but may also be used in other applications utilizing turbocharger units such as aero or marine systems.

A turbocharger unit is a vehicle component used together with an associated internal combustion engine, typically a diesel engine. The turbocharger configured to recover a part of the energy of the exhaust gas and to use that energy to compress intake air flowing into the combustion chamber of the internal combustion engine. Turbocharger units are commonly provided for increasing the efficiency and power of the internal combustion engine.

A turbocharger unit has three main components; a turbine for converting energy of the exhaust gas flow to a rotational movement of the turbine, a compressor rotationally connected to the turbine for compressing intake air, and a housing enclosing the turbine and the compressor as well as a rotating shaft, bearings, etc.

A turbine shaft, supporting the turbine, is supported in the bearing housing for allowing the turbine to rotate relative the housing. In order to minimize hot gas inflow from the gas path into the bearing housing supporting, the turbine shaft, as well as to prevent oil leakage in a reverse direction, sealing rings are used to seal between the static bearing housing and the rotating turbine shaft. As the static pressure level downstream the turbine wheel in some operating modes can be lower than the pressure inside the bearing housing a buffer air pressure is needed to prevent oil leakage.

US2013291828 describes seals being designed to help maintain a pressure differential between the relatively low pressure environment of the bearing housing and the potentially low pressure at the back face of the turbine in the turbine housing during operation of the engine in a normal fired mode. This prevents bearing oil (or other lubricant) leaking along the turbocharger shaft across the seals and into the turbine housing. Air is supplied to the turbine end seals so as to prevent leakage of oil into the turbine housing.

The same may be applied for a turbocompound unit arranged downstream of a turbocharger unit. A turbocompound unit is a vehicle component used for recovering a part of the energy of the exhaust gas flow and to convert that energy into a rotational movement of a shaft. The rotational movement of the shaft is transferred as a torque increase to the crankshaft of the engine of the vehicle. Normally, the turbocompound unit has a shaft wherein a turbine wheel is arranged at one distal end. When the internal combustion engine is running exhaust gas will flow into the turbocompound unit and cause the turbine wheel to rotate. Hence, the shaft of the turbocompound unit will rotate accordingly. The opposite end of the shaft is provided with a gear wheel which meshes with additional gears for causing a rotational connection between the shaft and the crankshaft. When the shaft is rotating due to exhaust gas flowing through the turbocompound unit, the rotational energy of the shaft will be transferred to the crankshaft as a torque increase.

The use of turbocompound units has proven to provide significant advantages on driving economics as well as on the environment the energy recovery from the exhaust gas flow will in fact reduce the fuel consumption of the vehicle.

The turbine shaft is supported in a bearing housing for allowing the turbine shaft to rotate relative the housing. In order to minimize hot gas inflow from the gas path into the bearing housing supporting the turbine shaft, as well as to prevent oil leakage in a reverse direction, sealing rings are, used to seal between the static bearing housing and the rotating turbine shaft. As the static pressure level downstream the turbine wheel in some operating modes can be lower than the pressure inside the bearing, housing a buffer air pressure is needed to prevent oil leakage.

Should the supply of air for some reason be subject to malfunction there is an immediate risk of leakage of crank case gases containing oil into the exhaust gas flow. Oil leakages into the exhaust gases will cause environment pollution or major failure on the exhaust after treatment system. Therefore such malfunction would cause an unplanned stop on road for the vehicle or otherwise lead to possible damages on the after treatment system.

It is desirable to provide a method and a system overcoming the above mentioned drawbacks of prior art units.

By detecting malfunction of the supply of pressurized fluid, and thereafter increasing the pressure inside the exhaust conduit downstream the turbine, a so called limp home mode is achieved whereby unplanned stops of the vehicle are avoided.

A method for preventing oil escape into an exhaust gas during operation of a turbocharged engine is therefore provided. The method comprises the steps of providing pressurized fluid to an area sealing off a bearing housing of an axial turbine unit from an adjacent exhaust conduit downstream of the axial turbine unit; and detecting a malfunction in said provision of pressurized fluid. In response to such malfunction detection, the method further comprises the step of controlling an exhaust pressure increasing device arranged downstream of the axial turbine unit for increasing the pressure inside the exhaust conduit upstream of the exhaust pressure increasing device.

In an embodiment, the step of detecting a malfunction is performed by measuring the pressure of said pressurized fluid, and by comparing said measured pressure value with a reference value. In another embodiment, the step of detecting a malfunction is performed by measuring the flow of said pressurized fluid, and by comparing said measured flow value with a reference value. Hence a pressure sensor or a tow sensor could be utilized, whereby a simple and robust construction is achieved.

In an embodiment the method further comprises the step of determining a desired operational status of the exhaust pressure increasing device. Following this, the exhaust pressure increasing device may be controlled to operate according to the desired operational status. Since the performance of the engine is affected by increasing the pressure inside the exhaust conduit upstream of the exhaust pressure increasing device, this is advantageous in that any degree of malfunction may be adequately compensated.

The step of determining the desired operational status may be performed by estimating a pressure difference between the bearing housing and the adjacent exhaust conduit, and calculating the desired operational status of the exhaust pressure increase device based on said estimated pressure difference. Over compensating the malfunction is thus avoided.

The pressure difference may be estimated based on the current engine torque and the current engine speed, which is advantageous in that dedicated pressure sensors are not required.

In an embodiment the step of estimating the pressure difference between the bearing housing and the adjacent exhaust conduit is performed by fetching a stored pressure difference value from a memory. As the pressure difference estimations are pre-stored, accessing such value is facilitated without the need for computational power.

The step of controlling said exhaust pressure increasing device may be performed by controlling the operation of a closed loop butterfly valve, or by controlling the operation of an exhaust pressure governor. Since these kinds of devices may be provided for allowing the engine to be operated in engine braking mode, no additional or tailor made components are required.

The step of controlling the exhaust pressure increasing device is in some embodiments performed to such an extent as to provide a positive pressure gradient from the turbo charger bearing housing, to the exhaust conduit, i.e. the pressure behind the turbine is higher than the pressure in the bearing housing. Oil leakage is thereby prevented, since the flow of gas is directed away from the exhaust conduit, into the bearing housing.

According to a further aspect, a computer program is provided comprising program code means for performing the steps of the method according to the first aspect when said program is run on a computer.

According to a yet further aspect a computer readable medium is provided, carrying a computer program comprising program code means for performing the steps of the method according to the first aspect when said program product is run on a computer.

According to a farther aspect a control unit for controlling an exhaust pressure increasing device is provided, the control unit being configured to perform the steps of the method according to the first aspect.

According to a yet further aspect a vehicle system is provided, comprising an exhaust pressure increasing device and an axial turbine unit arranged upstream of said exhaust pressure increasing device, said axial turbine unit comprising a fluid supply for providing pressurized fluid to an area sealing off a bearing housing of the axial turbine unit from an adjacent exhaust conduit. The vehicle system further comprises a control unit configured to monitor the operation of said fluid supply, wherein said control unit is further configured to control the operation of said exhaust pressure increasing device in response to a detected malfunction in said provision of pressurized fluid.

In an embodiment, the exhaust pressure increasing device is a closed loop butterfly valve or an exhaust pressure governor.

The vehicle system may further comprise a sensor for detecting the fluid flow and or the fluid pressure from said fluid supply.

In some embodiments the axial turbine unit is a turbocharger unit or a turbocompound unit.

The control unit may comprise a comparing unit configured to compare a measured value, representing the operation of the fluid supply, with a reference value. Further to this, the control unit may comprise a calculating unit configured to determine a value representing a desired operational status of the exhaust pressure increasing device, and wherein the control unit is further configured to control the exhaust pressure increasing device based on said determined value.

According to a yet further embodiment, a vehicle is provided comprising a vehicle system according to the aspect previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
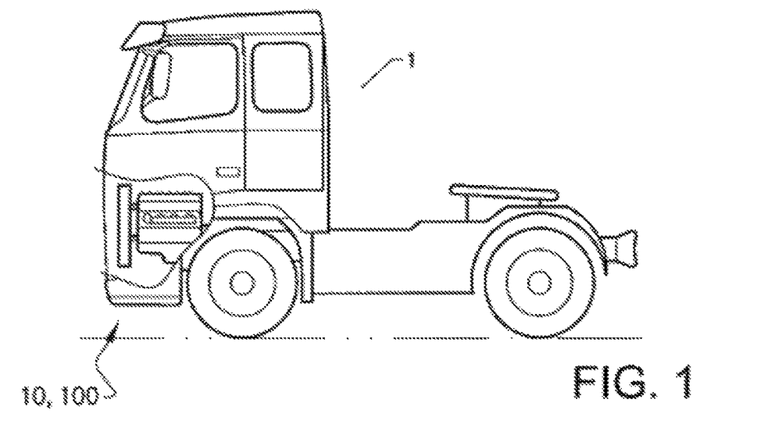
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with a vehicle system 100 according to various embodiments. The vehicle 1 may have additional propulsion units, such as electric drives etc. as long as it has at least one engine providing a flow of exhaust gases interacting with the vehicle system 100. Hence the vehicle 1 is not exclusively a truck but may also represent various heavy duty vehicles such as buses, constructional equipment, etc.

Figure 2:
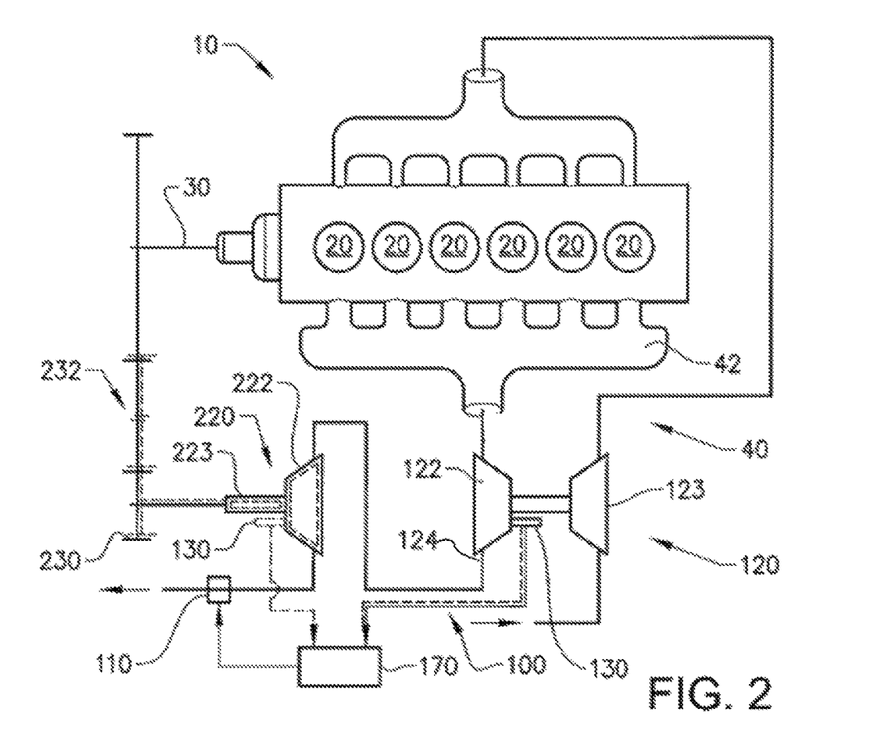
FIG. 2 is a schematic view of an internal combustion engine including a vehicle system according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters a manifold 42 which is further connected to an inlet 121 of a turbocharger unit 120. The exhaust gas flow causes a turbine wheel 122 to rotate, which rotation is translated to a corresponding rotation of a compressor wheel 123 being used to compress incoming air before it is introduced in the cylinders 20. The structural as well as functional specifications of a turbocharger unit 120 are well known in the art and will not be described in further details.

The exhaust gas exits the turbocharger 120 and flows downstream, optionally to a turbocompound unit 220. The incoming exhaust gas, from which some energy have already been used to drive the turbine wheel 122 of the turbocharger unit 120, is guided to pass a turbine wheel 222 of the turbocompound unit 220, thus causing the turbine wheel 222 and an associated turbine shaft 223 to rotate. The rotation of the turbine shaft 223 is transmitted to a corresponding rotation of a gear wheel 230. The gear wheel 230 meshes with further gearings 232 in order to couple the turbine shaft 222 of the turbocompound unit 220 to the crankshaft 30. Hence, when the turbine wheel 222 is forced to rotate the turbine shaft 223 will provide an additional torque tip the crankshaft 30.

In the shown embodiment, the turbocharger unit 120 has a radial turbine wheel 122, while the turbocompound unit 220 has an axial turbine wheel 222. However, in other embodiments the turbocharger unit 120 may have an axial turbine wheel 122, while the turbocompound unit 220 may have a radial or axial turbine wheel 222.

The vehicle system 100 comprises an axial turbine unit, i.e. the turbocharger unit 120, the turbocompound unit 220, or both. Further to this, the vehicle system 100 comprises a control unit 170 connected to an exhaust pressure increasing device 110 arranged downstream of the axial turbine unit 120, 220. A pressurized fluid supply 130 also forms part of the vehicle system 100, which pressurized fluid supply 130 is configured to provide pressurized fluid to an area sealing off a bearing housing of the axial turbine unit 120, 220 from an adjacent exhaust conduit. The control unit 170 is further configured to monitor the operation of the fluid supply 130, and to control the operation of the exhaust pressure increasing, device 110 in response to a detected malfunction of, the pressurized fluid supply 130. Malfunction of the fluid supply 130 may e.g. be detected by the provision of a differential pressure meter, arranged at the fluid supply 130 connected to the control unit 170.

The exhaust pressure increasing device 110 is preferably a closed loop butterfly valve, or an exhaust pressure governor. The pressure increasing device 110 is arranged within an exhaust gas conduit, extending from the axial turbine unit 120, 220 to further downstream aftertreatment components. Closed loop butterfly valves and exhaust pressure governors are well known in the art and will not be described further herein.

Figures 3, 4:
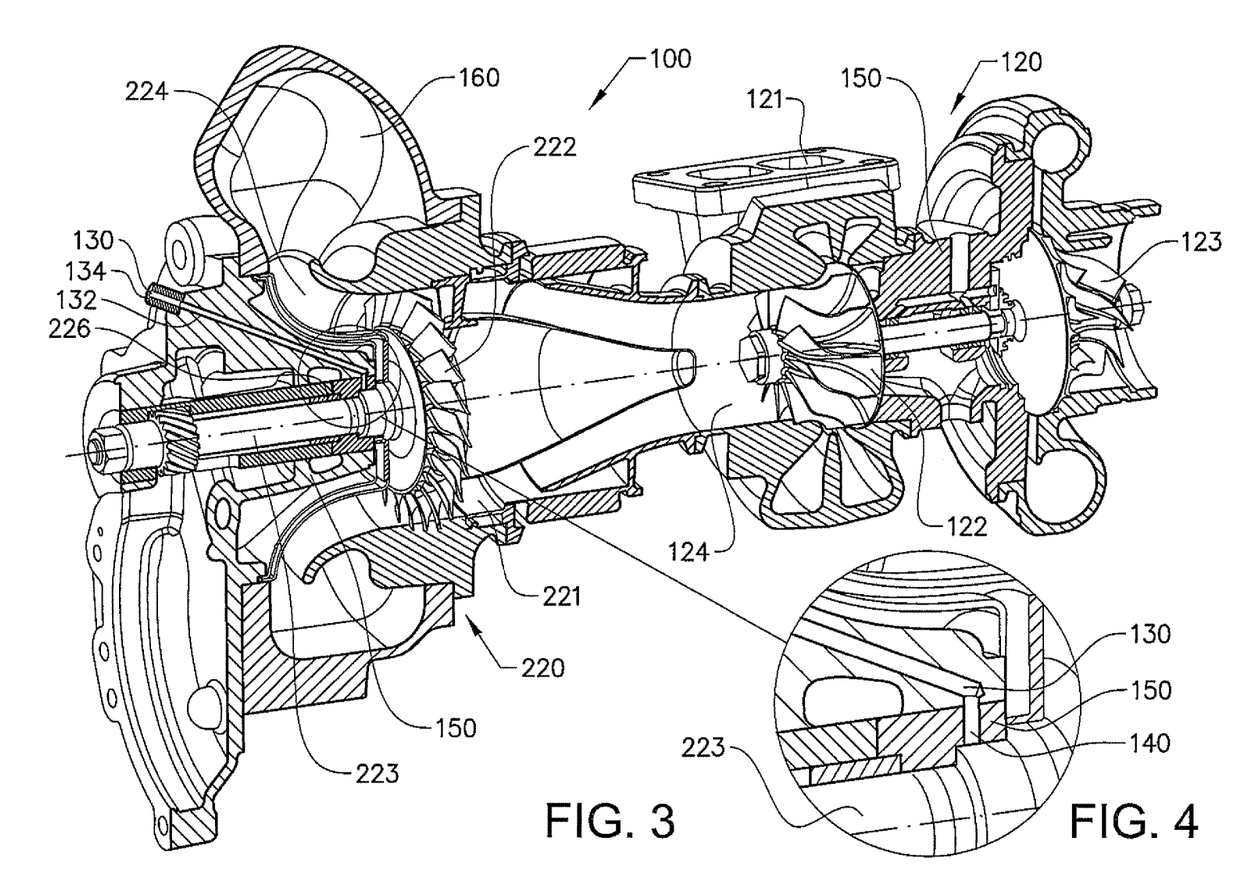
FIG. 3 is an isometric cross-sectional view of a turbocharger unit and a turbocompound unit forming pans of a vehicle system according to an embodiment.
FIG. 4 is a cross-sectional view of parts of the vehicle system shown in FIG. 3.

Now turning to FIGS. 3 and 4 the vehicle system 100 will be described in further details.

An axial turbine unit 220 in the form of a turbocompound unit is arranged in series with a radial turbine unit 120 in the form of a turbocharger unit.

Exhaust gas leaving an outlet 124 of the turbocharger unit 120 is directed to the axial-flow turbine wheel 222 of the turbocompound unit 220. The exhaust gas exhibits a pressure drop between an inlet 221 and an outlet 224 of the turbocompound unit 220, which pressure drop is converted by the turbine wheel 222 into kinetic energy that is supplied to the engine crankshaft 30 (see FIG. 2).

The turbocompound unit 220 comprises a turbine housing 150, and a shaft 223 rigidly connected to the turbine wheel 222 and being rotatably supported in the housing 150 by means of beatings 226.

The pressurized fluid supply 130 is arranged as a channel 132 extending through the bearing housing 150 from an inlet 134 to an area 140 located at the turbine shaft 223 bearing housing 150 interface, in close proximity to the turbine wheel 222. Hence, even if a suction force should be present at the turbine wheel side of the bearing housing 150, oil will be prevented from leaking out along the turbine shaft 223 as the area 140, being subject to an overpressure due to the pressurized fluid supply 130, will force such oil leakage away from the turbine wheel 222 and the exhaust gas channel 160.

As already described above, the pressurized fluid supply 130 is provided in order to overcome the disadvantage of a sub-pressure at the back side of an axial turbine wheel 222, which may lead to oil escaping into the exhaust gas channel 160.

Figure 5:
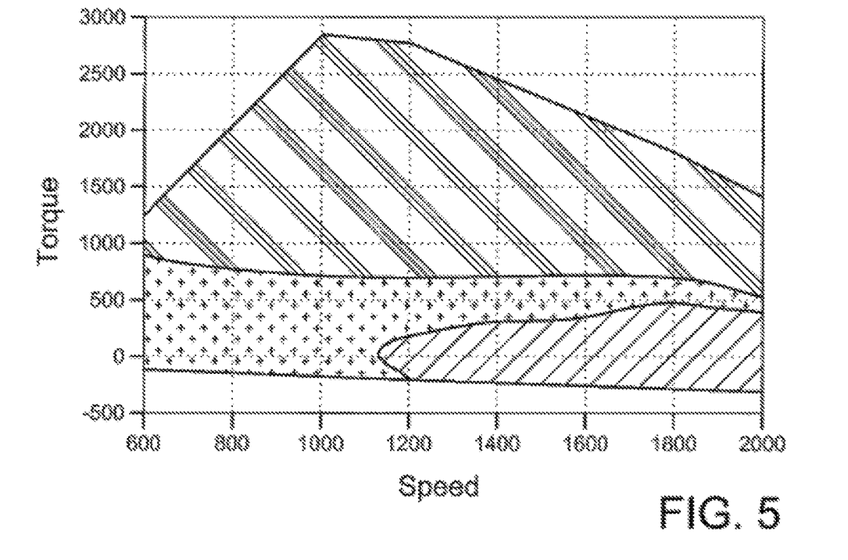
FIG. 5 is a diagram showing the torque of an internal combustion engine versus the speed of the internal combustion engine.

The risk for such sub-pressure is increased when the engine 10 is operating at high speed and low torque. A diagram showing the pressure behind the axial turbine wheel 222 as a function of engine torque and speed is shown in FIG. 5. The single-line dashed area, corresponding to a relative high engine speed at relatively low engine torque, is critical with respect to the pressure behind the turbine wheel 222 of the turbocompound unit 220 shown in FIG. 3. Hence, oil leakage is most likely to happen at operating conditions corresponding to this area.

Figure 6:
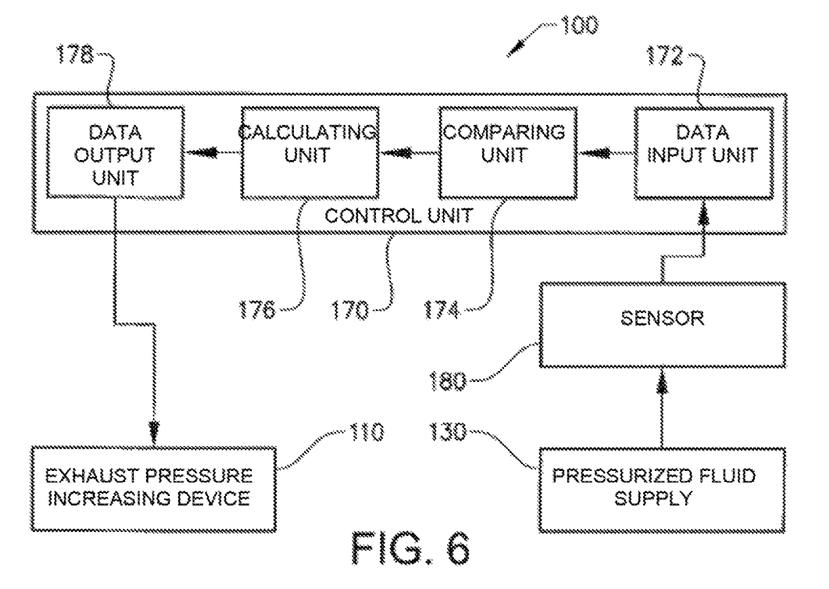
FIG. 6 is a schematic view of a vehicle system according to an embodiment.

Now turning to FIG. 6 the vehicle system 100 will be described, especially in terms of the control unit 170 and how it is connected to the pressurized fluid supply 130 and to the exhaust pressure increasing device 110. A sensor 180 is provided for sensing the operation of the pressurized fluid supply 130. For example, the sensor 180 may be realized by means of a pressure sensor or a flow sensor arranged in connection with the channel 132 used to direct pressurized fluid into the area 140 (see FIG. 4), or in connection with a pressure source, such as a pump or similar (not shown). The sensor 180 thus detects the operation of the pressurized fluid supply 130, and provides an output signal corresponding to the operational status of the supply 130 to the control unit 170. For this the control unit 170 comprises a data, input unit 172 that receives the sensor data. The data input unit 172 transmits the sensor data to a comparing unit 174, configured to compare the sensor data, representing the operation of the fluid supply 130, with a reference value. In case of a pressure sensor the reference value may be a value corresponding to a minimum required pressure, and in case of a flow sensor the reference value may be a value corresponding to the minimum required fluid flow. The comparing unit 174 will provide an output value, representing the operational status of the pressurized fluid supply 130, i.e. if it is operating correctly, or malfunctioning. In cases where the comparing unit 174 actually determines the pressurized fluid supply 130 to malfunction, a warning or alert may be presented to the driver. The comparing unit 174 will upon such malfunction transmit a malfunction signal to a calculating unit 176. The calculating unit 176 thus receives information representing failure mode of the pressurized fluid supply 130. Further to this, the calculating unit 176 determines a desired operational status of the exhaust pressure increasing device 110, and controls the exhaust pressure increasing device 110 based on the determined operational status via a data output unit 178, connected to the exhaust pressure increasing device 110. Preferably the calculating unit 176 is therefore also configured to determine the risk for oil escape, e.g. by accessing data corresponding to the diagram shown in FIG. 5. Such data may e.g. be pre-stored in a memory forming part of the control unit 170, located either on board the vehicle or off board the vehicle and made accessible by means of wireless data transfer. The data may be stored in a 3D table, such as a specific risk level is available for any given engine speed and engine torque. During operation the calculating unit 176 thus receives the actual engine speed and the actual engine torque, and thereby concludes the actual risk level by accessing the table. Based on the risk level the calculating; unit 176 may be configured to determine the desired operational status of the exhaust pressure increasing device 110 such that it is closed to an extent corresponding to a reduced risk for oil escape. For example, the calculating unit 176 may calculate that the risk for oil escape is 50%, and that closing the exhaust pressure increasing device 110 by 70% will reduce the risk for oil escape to below 5%, which may be a sufficiently low probability. Correspondingly, the data output unit 178 transmits a command to the exhaust pressure increasing device 110 corresponding to a closing action of 70%.

Figure 7:
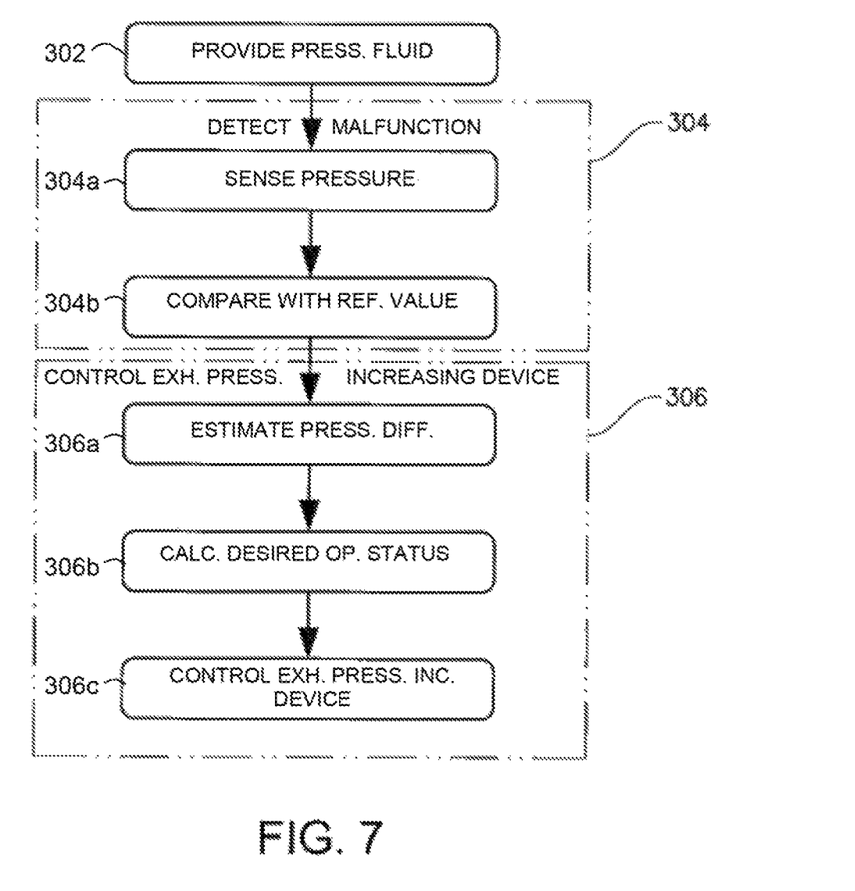
FIG. 7 is a schematic view of a method according to an embodiment.

Now turning to FIG. 7 a method 300 according to various embodiments will be described. The method 300 is performed in order to prevent oil escape into the exhaust gas during operation of a turbocharged engine 10. In a first step 302, pressurized fluid is provided to an area sealing off a bearing housing of an axial turbine unit from an adjacent exhaust conduit downstream of the axial turbine unit. In a step 304, preferably provided in parallel with step 302, a malfunction in said provision of pressurized fluid is detected. In response to such malfunction detection, the method performs a step 306 of controlling an exhaust pressure increasing device arranged downstream of the axial turbine unit for increasing the pressure inside the exhaust conduit upstream of the exhaust pressure increasing device. Preferably, step 306 is performed to such an extent as to provide a positive pressure gradient from the turbo chanter bearing housing to the exhaust conduit.

Step 304 may preferably be performed in a two-step sequence, comprising a first sub-step 304*a* of measuring the pressure of said pressurized fluid, and a second sub-step of comparing said measured pressure value with a reference value. Optionally, sub-step 304*a* is performed by measuring the flow of said pressurized fluid, wherein sub-step 304*b* is performed by comparing said measured flow value with a reference value.

Step 306 may preferably also be divided into several sub-steps 306*a-c*. In a first sub-step 306*a*, a desired operational status of the exhaust pressure increasing device is determined by estimating a pressure difference between the bearing housing and the adjacent exhaust conduit. The pressure difference may be estimated based on the current engine torque and the current engine speed, e.g. by fetching a pre-stored pressure difference value from a memory. In sub-step 306*b* the desired operational status of the exhaust pressure increase device is calculated based on said estimated pressure difference. A final step 306*c* may follow, in which the exhaust pressure increasing device is controlled to operate according to the desired operational status.

It is to be understood that the present invention is not limited to the embodiments described above and illustrated in the drawings; rather, the skilled person will recognize that many changes and modifications may be made within the scope of the appended claims.

The invention claimed is:

1. A method for preventing oil escape into an exhaust gas during operation of a turbocharged engine, comprising:
   providing pressurized air to an area sealing off a bearing housing of an axial turbine unit from an adjacent exhaust conduit downstream of the axial turbine unit; and
   detecting a malfunction in the provision of pressurized air;
   in response to such malfunction detection, controlling via a control unit an exhaust pressure increasing device arranged downstream of the axial turbine unit to increase the pressure inside the exhaust conduit upstream of the exhaust pressure increasing device.

2. The method according to claim 1, wherein the step of detecting a malfunction, is performed by a sensor sensing a pressure value of the pressurized air, and by comparing the sensed pressure value with a reference value.

3. The method according to claim 1, wherein the step of detecting a malfunction is performed by sensing a flow value of the pressurized air via a sensor, and by comparing the sensed flow value with a reference value.

4. The method according to claim 1, wherein the step of controlling the exhaust pressure increasing device comprises determining a target position of the exhaust pressure increasing device.

5. The method according to claim 4, wherein the exhaust pressure increasing device is controlled to achieve the target position.

6. The method according to claim 4, wherein the step of determining the target position comprises estimating a pressure difference between the bearing housing and the adjacent exhaust conduit.

7. The method according to claim 6, wherein the estimated pressure difference is based on a current engine torque and a current engine speed.

8. The method according to claim 7, wherein the step of estimating the estimated pressure difference comprises retrieving a stored pressure difference value from a memory.

9. The method according to claim 1, wherein the step of controlling the exhaust pressure increasing device is performed by controlling operation of a closed loop butterfly valve.

10. The method according to claim 1, wherein the step of controlling the exhaust pressure increasing device is performed by controlling operation of an exhaust pressure governor.

11. The method according to claim 1; wherein the step of controlling the exhaust pressure increasing device results in a higher pressure immediately downstream of the axial turbine unit than a pressure in the bearing housing.

12. A computer comprising a computer program for performing the steps of claim 1 when the program is run on the computer.

13. A non-transitory computer readable medium carrying a computer program for performing the steps of claim 1 when the program product is run on a computer.

14. A control unit for controlling an exhaust pressure increasing device, the control unit being configured to perform the steps of the method according to claim 1.

15. A vehicle system, comprising:
   an engine,
   an exhaust pressure increasing device,
   an axial turbine arranged upstream of the exhaust pressure increasing device, the axial turbine comprising an air supply providing pressurized air to an area sealing off a bearing housing of the axial turbine from an adjacent exhaust conduit, and
   a control unit configured to monitor a provision of the air supply via a sensor, wherein the control unit is further configured to control operation of the exhaust pressure increasing device in response to a detected malfunction in the provision of the pressurized air.

16. The vehicle system according to claim 15, wherein the exhaust pressure increasing device is a closed loop butterfly valve.

17. The vehicle system according to claim 15, wherein the exhaust pressure increasing device is an exhaust pressure governor.

18. The vehicle system according to claim 15, further comprising the sensor for detecting the air flow and/or the air pressure from the air supply.

19. The vehicle system according to claim 15, wherein the axial turbine is coupled to a compressor in a turbocharger or the axial turbine is coupled to the engine to transfer torque to a crankshaft of the engine.

20. The vehicle system according to claim 15, wherein the control unit comprises a comparing unit configured to compare a measured value, representing the provision of the air supply, with a reference value.

21. The vehicle system according to claim 20, wherein the control unit further comprises a calculating unit configured to determine a value representing a target position of the exhaust pressure increasing device, and wherein the control unit is further configured to control the exhaust pressure increasing device based on the determined value.

22. A vehicle comprising a vehicle system according to claim 15.

* * * * *